(12) United States Patent
Hsu

(10) Patent No.: US 7,787,094 B2
(45) Date of Patent: Aug. 31, 2010

(54) LIQUID CRYSTAL PANEL WITH ADJOINING ADHESIVE STRIPS AND LIQUID CRYSTAL PANEL ASSEMBLY AND LIQUID CRYSTAL DISPLAY WITH SAME

(75) Inventor: Fu-Yuan Hsu, Miao-Li (TW)

(73) Assignee: Chimei Innolux Corporation, Miao-Li County (TW)

( * ) Notice: Subject to any disclaimer, the term of this patent is extended or adjusted under 35 U.S.C. 154(b) by 397 days.

(21) Appl. No.: 11/803,208

(22) Filed: May 14, 2007

(65) Prior Publication Data
US 2007/0263160 A1  Nov. 15, 2007

(30) Foreign Application Priority Data
May 12, 2006  (TW) ............... 95116841 A

(51) Int. Cl.
G02F 1/1345 (2006.01)
G02F 1/1339 (2006.01)

(52) U.S. Cl. ...................... 349/149; 349/190

(58) Field of Classification Search ........... None
See application file for complete search history.

(56) References Cited

U.S. PATENT DOCUMENTS

| | | | |
|---|---|---|---|
| 6,219,126 B1 * | 4/2001 | Von Gutfeld | 349/153 |
| 6,222,603 B1 * | 4/2001 | Sakai et al. | 349/153 |
| 6,357,763 B2 * | 3/2002 | Mathew et al. | 277/628 |
| 6,791,660 B1 * | 9/2004 | Hayashi et al. | 349/190 |
| 6,862,072 B2 | 3/2005 | Liu et al. | |
| 7,068,339 B2 | 6/2006 | Nakamura et al. | |
| 7,280,179 B2 * | 10/2007 | Hsu et al. | 349/153 |
| 7,567,336 B2 * | 7/2009 | Jung et al. | 349/190 |
| 2003/0107699 A1 | 6/2003 | Jung et al. | |

FOREIGN PATENT DOCUMENTS

| | | |
|---|---|---|
| CN | 1591111 A | 3/2005 |
| TW | 200508725 A | 3/2005 |

* cited by examiner

Primary Examiner—Tina M Wong
(74) Attorney, Agent, or Firm—Wei Te Chung

(57) ABSTRACT

An exemplary liquid crystal panel includes (1) a first substrate (11), a second substrate (12) opposite to the first substrate, a first adhesive strip (13) provided at a periphery of the liquid crystal panel between the first and second substrates, and at least one second adhesive strip (14) in direct contact with an outside of the first adhesive strip. The first and second substrates are bonded to each other by the first adhesive strip and the at least one second adhesive strip.

20 Claims, 4 Drawing Sheets

LIQUID CRYSTAL PANEL WITH ADJOINING ADHESIVE STRIPS AND LIQUID CRYSTAL PANEL ASSEMBLY AND LIQUID CRYSTAL DISPLAY WITH SAME

CROSS-REFERENCE TO RELATED APPLICATION

This application is related to, and claims the benefit of, a foreign priority application filed in Taiwan as Serial No. 095116841 on May 12, 2006. The related application is incorporated herein by reference.

FIELD OF THE INVENTION

The present invention relates to a liquid crystal panel that includes a first adhesive strip and one or more second adhesive strips, to a liquid crystal panel assembly that includes a first adhesive strip and one or more second adhesive strips, and to a liquid crystal display that includes the liquid crystal panel.

GENERAL BACKGROUND

Liquid crystal displays are commonly used as display devices for compact electronic apparatuses, because they not only provide good quality images but are also very thin.

Referring to FIG. 8, a typical liquid crystal panel 8 includes an upper substrate 81, a lower substrate 82 opposite to the upper substrate 81, a first adhesive strip 83 formed at the periphery of the liquid crystal panel 8 between the upper and lower substrates 81, 82, and a liquid crystal layer 84 contained in a space defined by the upper and lower substrates 81, 82 and the first adhesive strip 83. The first adhesive strip 83 is used to adhere the upper and the lower substrates 81, 82 together, and surround and hermetically seal the liquid crystal layer 84.

The liquid crystal panel 8 is generally thin and compact so that it is suitable for various space-saving applications. The liquid crystal panel 8 is typically made by a mechanical milling method or a chemical etching method. A mechanical strength of the first adhesive strip 83 may insufficient to withstand external forces applied during a mechanical milling process. In such case, the first adhesive strip 83 is liable to be damaged by the external forces. On the other hand, a chemical stability of the first adhesive strip 83 may be insufficient to resist damage by corrosive solutions used in a chemical etching process. In such case, liquid crystal (not shown) of the liquid crystal layer 84 may become polluted. Thus, an optical performance of the liquid crystal panel 8 may be impaired.

What is needed, therefore, is a liquid crystal panel that can overcome the above-described limitations or deficiencies. What is also needed is a liquid crystal display that includes the liquid crystal panel.

SUMMARY

In one preferred embodiment, a liquid crystal panel includes a first substrate, a second substrate opposite to the first substrate, a first adhesive strip provided at a periphery of the liquid crystal panel between the first and second substrates, and at least one second adhesive strip in direct contact with an outside of the first adhesive strip. The first and second substrates are bonded to each other by the first adhesive strip and the at least one second adhesive strip.

Other novel features, advantages and aspects will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of at least one embodiment of the present invention. In the drawings, like reference numerals designate corresponding parts throughout various views, and all the views are schematic.

DETAILED DESCRIPTION OF PREFERRED EMBODIMENTS

Reference will now be made to the drawings to describe preferred embodiments of the present invention in detail.

Figure 1:
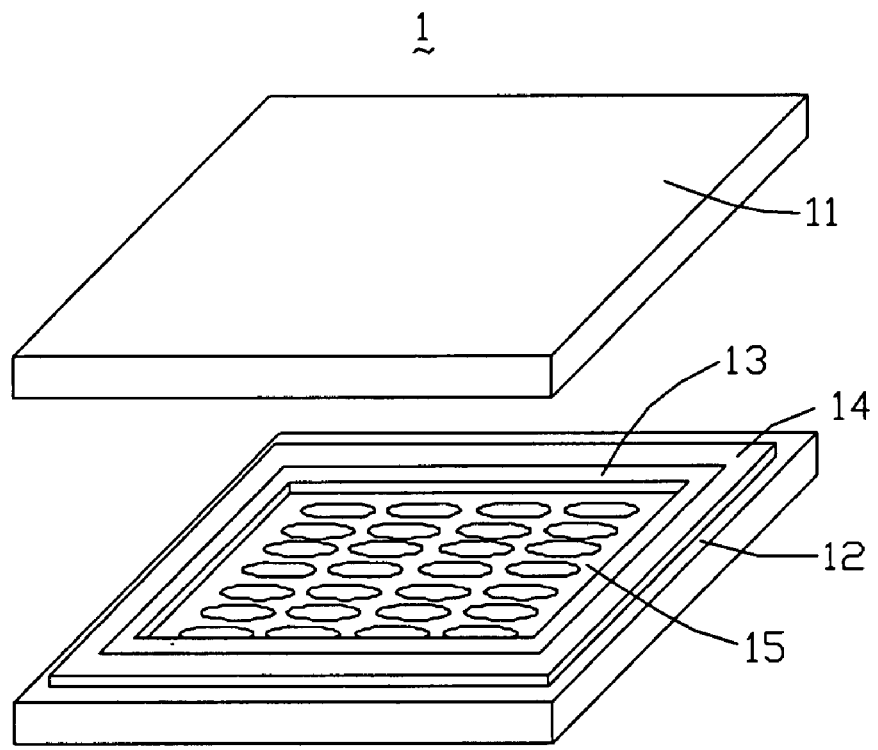
FIG. 1 is an exploded, isometric view of a liquid crystal panel according to a first embodiment of the present invention, the liquid crystal panel including an upper substrate and a lower substrate opposite to the upper substrate.

Referring to FIG. 1, a liquid crystal panel 1 according to a first embodiment of the present invention is shown. The liquid crystal panel 1 includes an upper substrate 11, a lower substrate 12 opposite to the upper substrate 11, a first adhesive strip 13 formed at a periphery of the liquid crystal panel 1 between the upper and lower substrates 11, 12, a second adhesive strip 14 adjoining an outside of the first adhesive strip 13, and a liquid crystal layer 15 contained in a space (not labeled) defined by the upper and lower substrates 11, 12 and the first adhesive strip 13. The upper substrate 11 includes a color filter layer (not visible) formed thereat. The lower substrate 12 includes a plurality of thin film transistors (TFTs, not shown) formed thereat.

The first adhesive strip 13 is used to adhere the upper and the lower substrates 11, 12 together, and surround and hermetically seal the liquid crystal layer 15. Typically, the first adhesive strip 13 is made from resin. In one exemplary embodiment, the first adhesive strip 13 is made from epoxy resin.

The second adhesive strip 14 is in direct, continuous contact with outer peripheral sides of the first adhesive strip 13. A material of the second adhesive strip 14 is different from that of the first adhesive strip 13. In particular, a chemical stability of the second adhesive strip 14 is greater than that of the first adhesive strip 13. Typically, the second adhesive strip 14 is made from adhesive colloid or adhesive glue, such as ultraviolet-curable colloid, instantaneous drying adhesive, or cyanoacrylate adhesive.

The second adhesive strip 14 is in immediate contact with the outer sides of the first adhesive strip 13. Therefore, the first adhesive strip 13 can be protected from being damaged by external forces that are generated in manufacturing of the liquid crystal panel 1. Moreover, the second adhesive strip 14 has good chemical stability. Therefore, the second adhesive strip 14 can strongly resist damage by corrosive solutions used in a chemical etching method in manufacturing of the liquid crystal panel 1. Accordingly, pollution of liquid crystal of the liquid crystal layer 15 can be prevented. Thus, the reliability of the liquid crystal panel 1 is improved, and the liquid crystal panel 1 can provide good, long-lasting optical performance.

Figure 2:
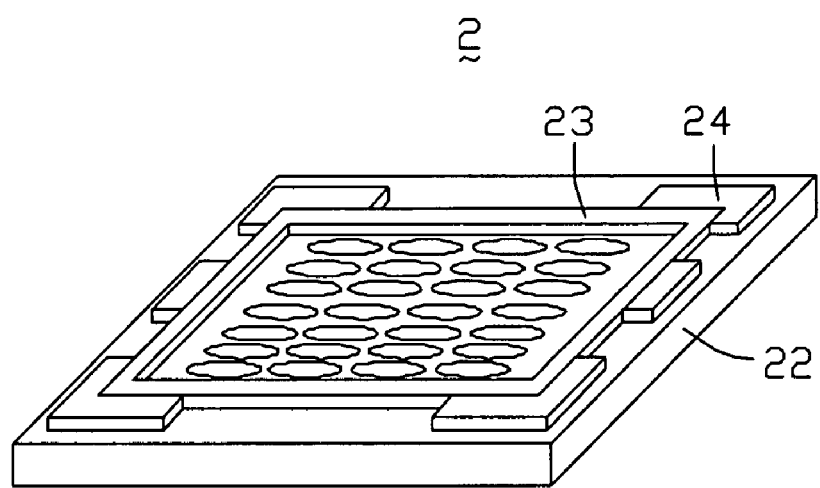
FIG. 2 is an isometric view of a lower substrate of a liquid crystal panel according to a second embodiment of the present invention.

Referring to FIG. 2, a liquid crystal panel 2 according to a second embodiment of the present invention is similar to the liquid crystal panel 1. However, the liquid crystal panel 2 includes an upper substrate (not shown), a lower substrate 22 opposite to the upper substrate, a first adhesive strip 23 formed at a periphery of the liquid crystal panel 2 between the upper substrate and the lower substrate 22, and a plurality of second adhesive strips 24 adjoining an outside of the first adhesive strip 23. The second adhesive strips 24 are in direct (immediate) contact with outer peripheral sides of corresponding parts of the first adhesive strip 23. In the illustrated embodiment, there are four second adhesive strips 24 respectively in direct contact with four corners of the first adhesive strip 23, and two second adhesive strips 24 in direct contact with central parts of two opposite of the outer peripheral sides of the first adhesive strip 23. That is, the second adhesive strips 24 are positioned at parts of the first adhesive strip 23 that are most liable to sustain damage or corrosion. The liquid crystal panel 2 has advantages similar to those described above in relation to the liquid crystal panel 1.

Figure 3:
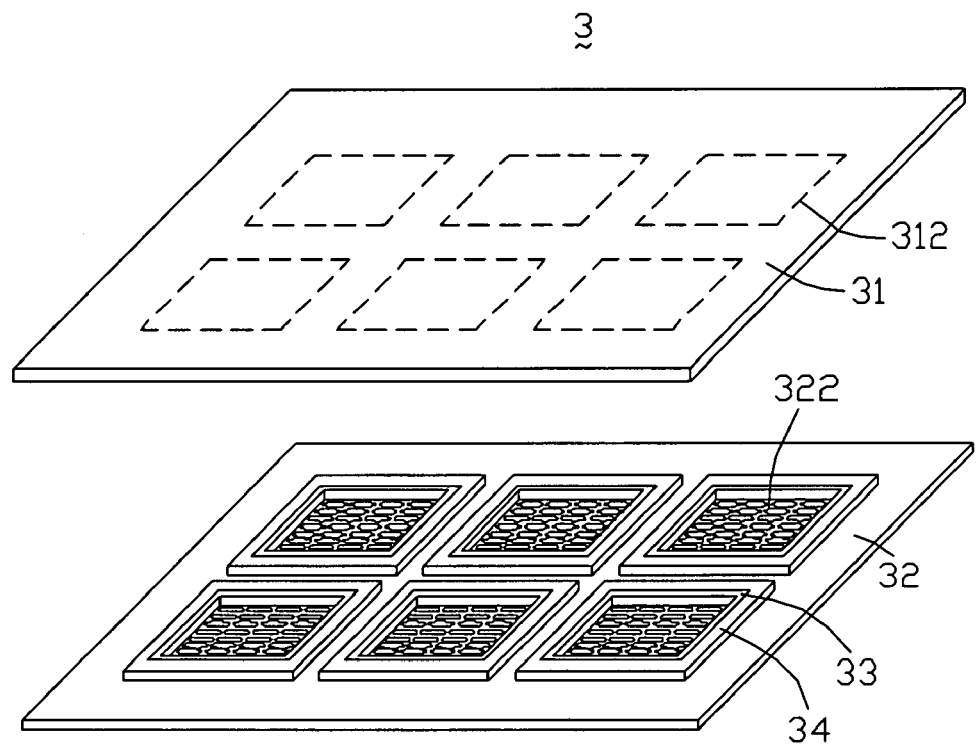
FIG. 3 is an exploded, isometric view of a liquid crystal panel assembly according to a third embodiment of the present invention.

Referring to FIG. 3, a liquid crystal panel assembly 3 according to a third embodiment of the present invention is similar in principle to the liquid crystal panel 1. However, the liquid crystal panel assembly 3 includes an arrangement of liquid crystal panel units therein. The liquid crystal panel units are arranged in an m×n matrix. More particularly, the liquid crystal panel assembly 3 includes an upper substrate 31 and a lower substrate 32 opposite to the upper substrate 31. The upper substrate 31 includes a plurality of color filter units 312 formed thereat, each color filter unit 312 belonging to a respective liquid crystal panel unit. The lower substrate 32 includes a plurality of TFT regions 322 defined thereat, each TFT region 322 belonging to a respective liquid crystal panel unit. That is, each of the color filter units 312 corresponds to the respective one of the TFT regions 322. Each liquid crystal panel unit includes a first adhesive strip 33 formed at a periphery of the respective TFT region 322, and a second adhesive strip 34 adjoining an outside of the first adhesive strip 33. The second adhesive strip 34 is in direct, continuous contact with outer peripheral sides of the first adhesive strip 33. A material of the second adhesive strip 34 is different from that of the first adhesive strip 33. Each of the liquid crystal panel units of the liquid crystal panel assembly 3 has advantages similar to those described above in relation to the liquid crystal panel 1. After the liquid crystal panel assembly 3 has been fully assembled, the liquid crystal panel units are separated from each other to obtain individual liquid crystal panels (not shown). The liquid crystal panel units can be separated from each other by, for example, cutting or shearing.

Figure 4:
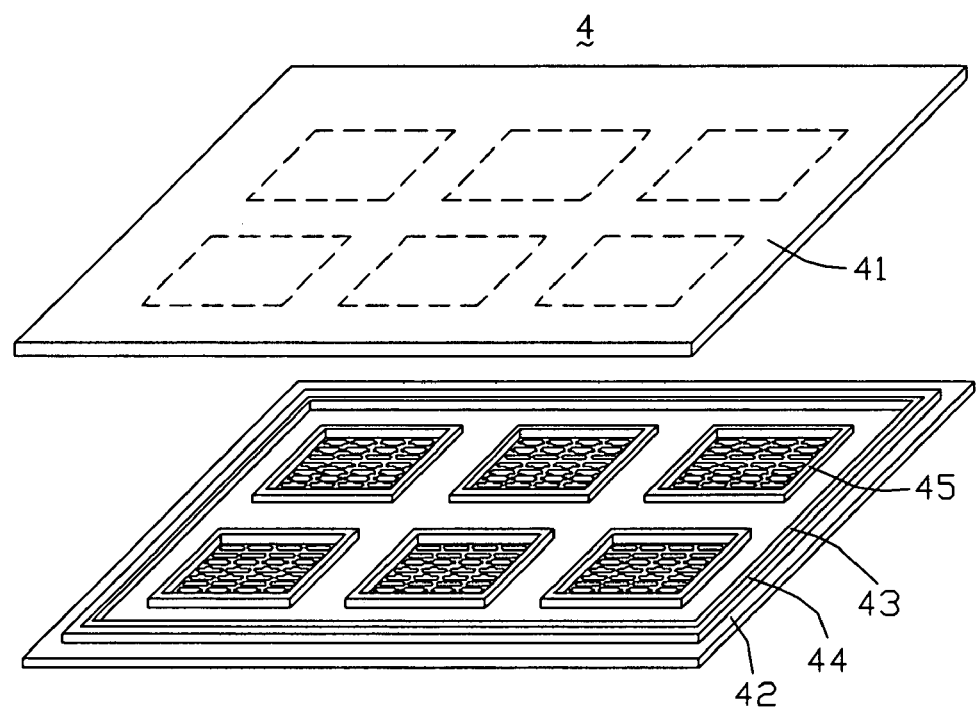
FIG. 4 is an exploded, isometric view of a liquid crystal panel assembly according to a fourth embodiment of the present invention.

Referring to FIG. 4, a liquid crystal panel assembly 4 according to a fourth embodiment of the present invention is similar to the liquid crystal panel assembly 3. However, the liquid crystal panel assembly 4 includes an upper substrate 41, a lower substrate 42 opposite to the upper substrate 41, a first adhesive strip 43 at the periphery of the liquid crystal panel assembly 4 between the upper and lower substrates 41, 42, a second adhesive strip 44 adjoining an outside of the first adhesive strip 43, and a plurality of liquid crystal panel units (not labeled). The liquid crystal panel units are arranged in an m×n matrix within an area generally surrounded by the first adhesive strip 43. The second adhesive strip 44 is in direct, continuous contact with outer peripheral sides of the first adhesive strip 43. A material of the second adhesive strip 44 is different from that of the first adhesive strip 43. Each of the liquid crystal panel units includes a third adhesive strip 45 formed at a periphery thereof. A mechanical strength and a chemical stability of the liquid crystal panel units of the liquid crystal panel assembly 4 are improved.

Figure 5:
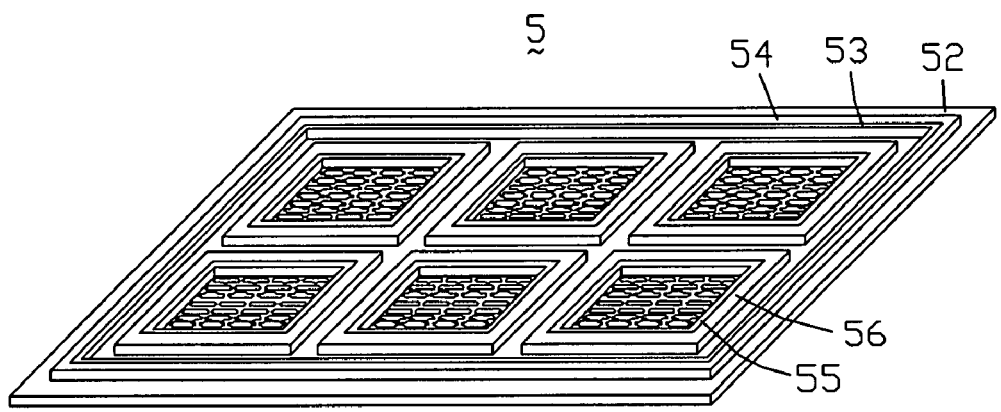
FIG. 5 is an isometric view of a lower substrate of a liquid crystal panel assembly according to a fifth embodiment of the present invention.

Referring to FIG. 5, a liquid crystal panel assembly 5 according to a fifth embodiment of the present invention is similar to the liquid crystal panel assembly 4. However, the liquid crystal panel assembly 5 includes an upper substrate (not shown), a lower substrate 52 opposite to the upper substrate, a first adhesive strip 53 at the periphery of the liquid crystal panel assembly 5 between the upper substrate and the lower substrate 52, a second adhesive strip 54 adjoining an outside of the first adhesive strip 53, and a plurality of liquid crystal panel units (not labeled). The liquid crystal panel units are arranged in an m×n matrix within an area generally surrounded by the first adhesive strip 53. The second adhesive strip 54 is in direct, continuous contact with outer peripheral sides of the first adhesive strip 53. A material of the second adhesive strip 54 is different from that of the first adhesive strip 53. Each of the liquid crystal panel units includes a third adhesive strip 55 formed at a periphery thereof, and a fourth adhesive strip 56 adjoining an outside of the third adhesive strip 55. The fourth adhesive strip 56 is in direct, continuous contact with outer peripheral sides of the third adhesive strip 55. A material of the fourth adhesive strip 56 is different from that of the third adhesive strip 55. Each of the liquid crystal panel units of the liquid crystal panel assembly 5 has advantages similar to those described above in relation to the liquid crystal panel 1 and the liquid crystal panel assembly 4.

Figure 6:
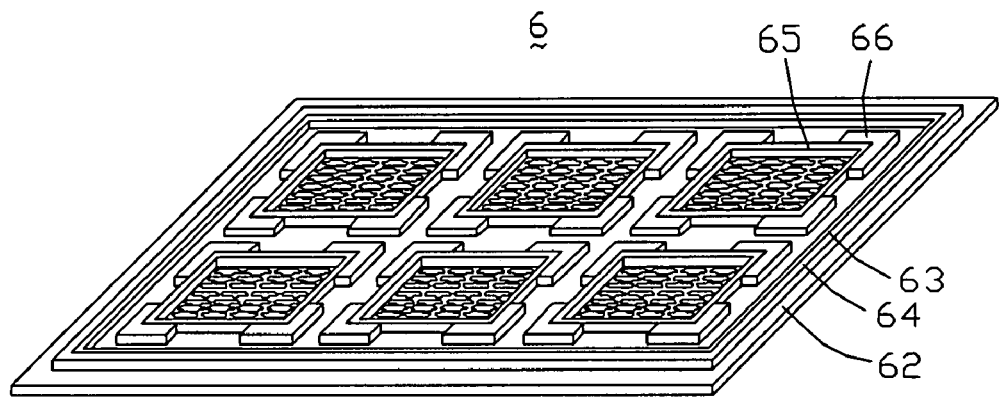
FIG. 6 is an isometric view of a lower substrate of a liquid crystal panel assembly according to a sixth embodiment of the present invention.

Referring to FIG. 6, a liquid crystal panel assembly 6 according to a sixth embodiment of the present invention is similar to the liquid crystal panel assembly 5. However, the liquid crystal panel assembly 6 includes an upper substrate (not shown), a lower substrate 62 opposite to the upper substrate, a first adhesive strip 63 formed at the periphery of the liquid crystal panel assembly 6 between the upper substrate and the lower substrate 62, a second adhesive strip 64 adjoining an outside of the first adhesive strip 63, and a plurality of liquid crystal panel units (not labeled). The liquid crystal panel units are arranged in an m×n matrix within an area generally surrounded by the first adhesive strip 63. The second adhesive strip 64 is in direct, continuous contact with outer peripheral sides of the first adhesive strip 63. Each of the liquid crystal panel units includes a third adhesive strip 65 formed at a periphery thereof, and a plurality of fourth adhesive strips 66 adjoining an outside of the third adhesive strip 65. The fourth adhesive strips 66 are in direct, discontinuous contact with outer peripheral sides of corresponding parts of the third adhesive strip 65. In the illustrated embodiment, there are four fourth adhesive strips 66 respectively in direct contact with four corners of the third adhesive strip 65. That is, the fourth adhesive strips 66 are positioned at parts of the third adhesive strip 65 that are most liable to sustain damage or corrosion. Each of the liquid crystal panel units of the liquid crystal panel assembly 6 has advantages similar to those described above in relation to the liquid crystal panel 2 and the liquid crystal panel assembly 5.

Figure 7:
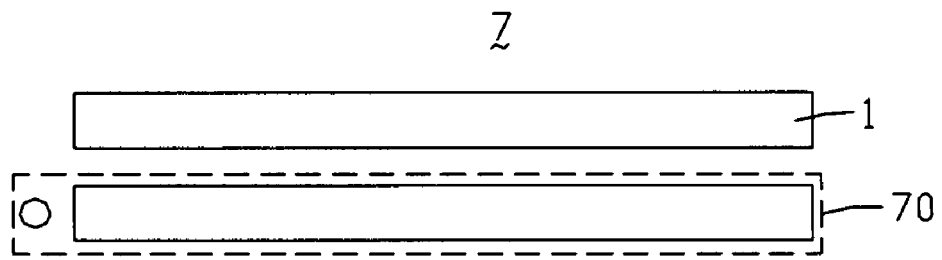
FIG. 7 is an exploded, side-on view of a liquid crystal display according to an exemplary embodiment of the present invention, the liquid crystal display including the liquid crystal panel of FIG. 1.
Figure 8:
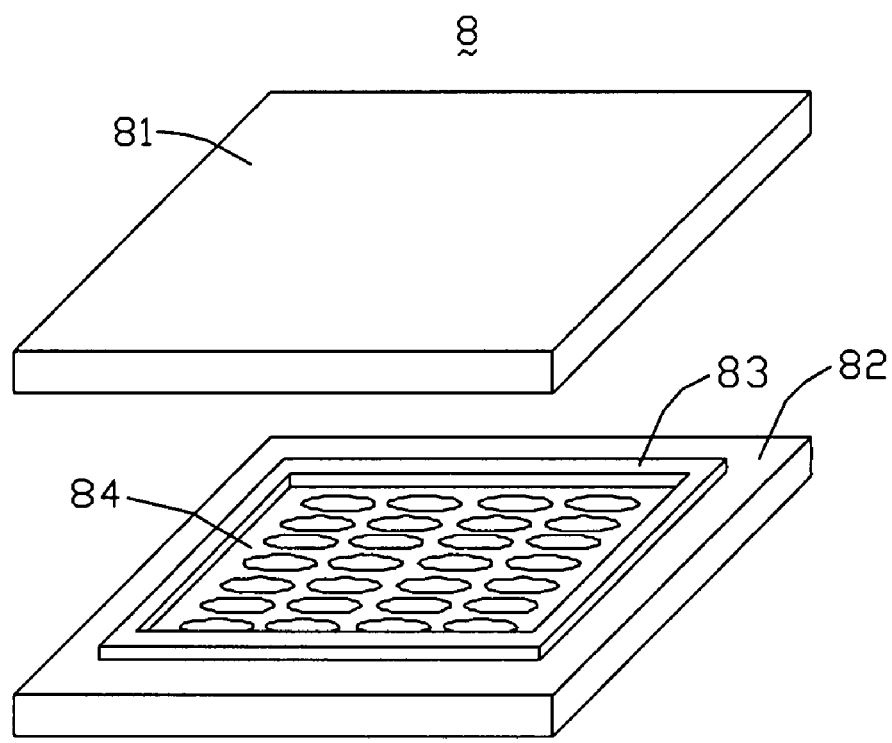
FIG. 8 is an exploded, isometric view of a conventional liquid crystal panel.

In FIG. 7, a liquid crystal display 7 according to an exemplary embodiment of the present invention is shown. The liquid crystal display 7 includes the liquid crystal panel 1, and a backlight module 70 located adjacent the liquid crystal panel 1. In alternative embodiments, the liquid crystal panel 1 can be replaced with the liquid crystal panel 2, or with any of the individual liquid crystal panels derived from any of the liquid crystal panel assemblies 3, 4, 5 or 6.

It is believed that the present embodiments and their advantages will be understood from the foregoing description, and it will be apparent that various changes may be made thereto without departing from the spirit or scope of the invention or sacrificing all of its material advantages, the examples hereinbefore described merely being preferred or exemplary embodiments of the invention.

What is claimed is:

1. A liquid crystal panel comprising:
   a first substrate;
   a second substrate opposite to the first substrate;
   a liquid crystal layer between the first and second substrates;
   a first adhesive strip provided at a periphery of the liquid crystal panel between the first and second substrates; and
   at least one second adhesive strip in direct contact with an outside of the first adhesive strip, the outside of the first adhesive strip being that part of the first adhesive strip nearest the outmost periphery of the liquid crystal panel;
   wherein the first and second substrates are bonded to each other by the first adhesive strip, the first and second substrates are also bonded to each other by the at least one second adhesive strip, and the first adhesive strip surrounds and hermetically seals the liquid crystal layer.

2. The liquid crystal panel as claimed in claim 1, wherein the at least one second adhesive strip is in direct, continuous contact with outer peripheral sides of the first adhesive strip.

3. The liquid crystal panel as claimed in claim 1, wherein the at least one second adhesive strip is a plurality of second adhesive strips, and the second adhesive strips are in direct, discontinuous contact with outer peripheral sides of the first adhesive strip.

4. The liquid crystal panel as claimed in claim 3, wherein the second adhesive strips are positioned at selected parts of the first adhesive strip that are most liable to sustain damage or corrosion in manufacturing of the liquid crystal panel.

5. The liquid crystal panel as claimed in claim 4, wherein the first adhesive strip comprises a plurality of corners, and the second adhesive strips respectively abut parts of the first adhesive strip selected from the group consisting of any corner of the first adhesive strip and a central part of any outer peripheral side of the first adhesive strip.

6. The liquid crystal panel as claimed in claim 1, wherein a material of the second adhesive strip is different from that of the first adhesive strip.

7. The liquid crystal panel as claimed in claim 6, wherein a chemical stability of the second adhesive strip is greater than that of the first adhesive strip.

8. The liquid crystal panel as claimed in claim 7, wherein the first adhesive strip is made from material selected from the group consisting of resin and epoxy resin, and the second adhesive strip is made from material selected from the group consisting of adhesive colloid, adhesive glue, ultraviolet-curable colloid, instantaneous drying adhesive, and cyanoacrylate adhesive.

9. A liquid crystal panel assembly comprising:
   a first substrate;
   a second substrate opposite to the first substrate;
   a first adhesive strip provided at a periphery of the liquid crystal panel assembly between the first and second substrates;
   a second adhesive strip in direct contact with an outside of the first adhesive strip, the outside of the first adhesive strip being that part of the first adhesive strip nearest the outmost periphery of the liquid crystal panel assembly; and
   a plurality of liquid crystal panel units defined within an area of the liquid crystal panel assembly generally surrounded by the first adhesive strip;
   wherein the first and second substrates are bonded to each other by the first adhesive strip, and the first and second substrates are also bonded to each other by the second adhesive strip.

10. The liquid crystal panel assembly as claimed in claim 9, wherein the first substrate comprises a plurality of color filter units formed thereat, the second substrate comprises a plurality of thin film transistor regions respectively corresponding to the color filter units, and each of the color filter units and a respective one of the thin film transistor regions cooperatively form a respective one of the liquid crystal panel units.

11. The liquid crystal panel assembly as claimed in claim 9, wherein each of the liquid crystal panel units comprises a third adhesive strip at a periphery thereof, and the first and second substrates are further bonded to each other by the third adhesive strip.

12. The liquid crystal panel assembly as claimed in claim 11, wherein each of the liquid crystal panel units further comprises at least one fourth adhesive strip in direct contact with an outside of the third adhesive strip.

13. The liquid crystal panel assembly as claimed in claim 12, wherein the at least one fourth adhesive strip is in direct, continuous contact with outer peripheral sides of the third adhesive strip, the outer peripheral sides of the third adhesive strip being those parts of the third adhesive strip nearest the outmost periphery of the liquid crystal panel unit.

14. The liquid crystal panel assembly as claimed in claim 13, wherein the at least one fourth adhesive strip is a plurality of fourth adhesive strips, and the fourth adhesive strips are in direct, discontinuous contact with outer peripheral sides of the third adhesive strip.

15. The liquid crystal panel assembly as claimed in claim 14, wherein the fourth adhesive strips are positioned at selected parts of the third adhesive strip that are most liable to sustain damage or corrosion in manufacturing and processing of the liquid crystal panel assembly.

16. The liquid crystal panel assembly as claimed in claim 15, wherein the third adhesive strip comprises a plurality of corners, and the fourth adhesive strips respectively abut parts of the third adhesive strip selected from the group consisting of any corner of the third adhesive strip and a central part of any outer peripheral side of the third adhesive strip.

17. The liquid crystal panel assembly as claimed in claim 9, wherein a material of the second adhesive strip is different from that of the first adhesive strip.

18. The liquid crystal panel assembly as claimed in claim 12, wherein a material of the at least one fourth adhesive strip is different from that of the third adhesive strip.

19. A liquid crystal display comprising:
   a backlight module; and a liquid crystal panel adjacent the backlight module, the liquid crystal panel comprising:

a first substrate;

a second substrate generally opposite to the first substrate;

a liquid crystal layer between the first and second substrates;

a first adhesive strip formed at a periphery of the liquid crystal panel between the first and second substrates; and at least one second adhesive strip in direct contact with an outside of the first adhesive strip, the outside of the first adhesive strip being that part of the first adhesive strip nearest the outmost periphery of the liquid crystal panel;

wherein the first and second substrates are bonded to each other by the first adhesive strip, the first and second substrates are also bonded to each other by the at least one second adhesive strip, and the first adhesive strip surrounds and hermetically seals the liquid crystal layer.

20. The liquid crystal panel as claimed in claim 1, wherein the first adhesive strip directly surrounds the liquid crystal layer.

\* \* \* \* \*